United States Patent [19]

Suzuki et al.

[11] Patent Number: 4,935,916
[45] Date of Patent: Jun. 19, 1990

[54] APPARATUS FOR RECORDING AND REPRODUCING INFORMATION INCLUDING ENERGY STORING MEANS

[75] Inventors: Kenichi Suzuki; Kazuo Minoura, both of Yokohama, Japan

[73] Assignee: Canon Kabushiki Kaisha, Tokyo, Japan

[21] Appl. No.: 307,167

[22] Filed: Feb. 6, 1989

Related U.S. Application Data

[63] Continuation of Ser. No. 865,016, May 20, 1986, abandoned.

[30] Foreign Application Priority Data

May 22, 1985 [JP] Japan .................. 60-108278

[51] Int. Cl.$^5$ ................... G11B 19/26; G11B 19/20; G06K 13/08
[52] U.S. Cl. ................... 369/215; 369/219; 369/221; 369/258; 235/480; 235/454; 235/479
[58] Field of Search ............... 360/2, 73.04, 71, 74.1, 360/88, 101, 73.01, 73.09; 235/449, 470, 479, 480, 454, 475–477; 369/32, 93, 176, 233, 239, 258, 263, 215, 219, 221

[56] References Cited

U.S. PATENT DOCUMENTS

| | | | |
|---|---|---|---|
| 3,803,388 | 4/1974 | Williamson et al. | 360/101 X |
| 3,822,376 | 7/1974 | Kok et al. | 360/2 X |
| 3,896,291 | 7/1975 | Wiedeman | 235/480 |
| 3,940,796 | 2/1976 | Haun et al. | 235/479 |
| 3,953,887 | 4/1976 | Kobylarz et al. | 360/2 |
| 4,047,229 | 9/1977 | Kobylarz et al. | 360/2 |
| 4,151,564 | 4/1979 | Schreiber et al. | 360/2 |
| 4,309,601 | 1/1982 | Nally et al. | 235/449 |
| 4,598,196 | 7/1986 | Pierce et al. | 235/477 |

FOREIGN PATENT DOCUMENTS 25129 2/1971 Australia .
62043263 4/1983 Japan .

*Primary Examiner*—Alan Faber
*Assistant Examiner*—Steven R. Garland
*Attorney, Agent, or Firm*—Fitzpatrick, Cella, Harper & Scinto

[57] ABSTRACT

An information recording and reproducing apparatus comprises a mount table on which an information recording medium is mounted, a structure for reciprocating the mount table relative to a recording and reproducing head, and an energy storer for decelerating the mount table in a deceleration mode, storing an energy generated during the deceleration and transducing the stored energy to a kinetic energy of the mount table in an acceleration mode to accelerate the mount table.

10 Claims, 5 Drawing Sheets

APPARATUS FOR RECORDING AND REPRODUCING INFORMATION INCLUDING ENERGY STORING MEANS

This application is a continuation of application Ser. No. 865,016, filed May 20, 1986, and now abandoned.

BACKGROUND OF THE INVENTION

The present invention relates to an apparatus for recording and/or reproducing information by reciprocating a card-like or sheet like information bearing medium relative to a head which records and/or reproduces information. In the present invention, the term information recording and reproducing apparatus means any of the record-only apparatus, reproduce-only apparatus and record/reproduce apparatus.

The prior art apparatus for recording and reproducing information by using a light beam uses an optical disk which is a rotating disk-shaped recording medium, an optical card which is a reciprocating card-shaped reading medium or an optical tape. Such apparatus have their respective features and are selectively used depending on applications and purposes. Among others, the optical card has a wide range of applications because of easiness of manufacture, portability and high accessability.

There are many ways to scan the light beam on the optical card. In one method, an irradiation position of the light beam is linearly and relatively moved on the recording medium to attain the reciprocal movement, and the beam irradiation position is relatively moved orthogonally to the direction of the reciprocal movement to attain the scan operation. In this method, the mechanism is simple, the precision is high and the effective space on the medium is large.

There are many mechanisms for reciprocating the card-like medium. A mechanism shown in FIG. 1 is frequently used for a magnetic card.

In FIG. 1, numeral 1 denotes a magnetic card, numeral 2 denotes a magnetic stripe which is an information recording area, numeral 3 denotes a magnetic head, and numerals 4a–4d denote roller pairs at least one of each of which has a driving power. The magnetic card 1 pinched by the roller pairs 4a–4d is reciprocally moved in a direction A as the rollers 4a–4d are rotated. Through this movement, a processing area on the magnetic stripe 2 is moved under the magnetic head 3 so that the information on the processing area is reproduced or new information recorded on the processing area.

Where the information width in the direction B shown in FIG. 1 is wide like in the magnetic card or an optical card which uses a bar code, the mechanism shown in FIG. 1 is acceptable, because even if the card 1 is skewed to the direction B by the misalignment during the insertion or during the reciprocal movement by the rollers 4a–4d, it does not affect to the recording and reproducing since the information width in the direction B is sufficiently wide. In the magnetic card and bar code optical card, the information is recorded or reproduced in one reciprocation of the card 1. Accordingly, the card feed speed need not be so high.

With the advancement of the light recording technique, it has been proposed to reduce a size of an information unit (called pit) to 5 $\mu$m–10 $\mu$m and increased information quantity stored in one card 1 to 10–20 Mbits. Where such a large quantity of information is reproduced and recorded, a high recording and reproducing speed is required as a matter of course. It is needless to say that the mechanism shown in FIG. 1 is not proper for such optical card, because the skew in the direction B is critical. The variation of the speed in the direction A and the durability of the card 1 are also critical because the card 1 is reciprocated at a high speed in the direction A.

As an approach to solve the above problem, a construction is proposed in which the card 1 is mounted on a card mount which in turn is reciprocated (U.S. Ser. No. 814,774, the same assignee). An example of such card mount is shown in FIGS. 2 and 3.

In FIG. 2, numeral 11 denotes a card mount (called a shuttle) and numerals 12 and 12' denote projections provided at one end of the shuttle 11. The projections 12 and 12' have coaxial apertures into which bearings 14 and 14' made of high sliding shaft 13 is fitted to the bearings 14 and 14'. Rollers 15 and 16 are rotatably mounted at the other and of the shuttle 11 and a fixed shaft 17 is pinched by the rollers 15 and 16. The shuttle 11 is slidably mounted to the fixed shafts 13 and 17. Play between the fixed shaft 13 and the bearings 14 and 14', and play between the fixed shaft 17 and the rollers 15 and 16 are small, just so long as the shuttle 11 can be smoothly slid.

The shuttle 11 has a step 18 to form a gap which is slightly wider than a thickness of a card 21, between card pushing members 19 and 20. Numerals 22 and 22' denote resilient members which urge the card 21 to an edge 18' of the step 18. Numeral 23 denotes a projection provided on the shuttle 11. When the card 21 is inserted from a left bottom position in FIG. 2, the projection 23 serves to stop the card 21 at a predetermined position. Numeral 24 denotes a belt having a portion thereof fixed to the shuttle 11.

Numeral 25 denotes an information recording area on the card 21, numeral 26 denotes an information track, numeral 27 denotes an optical head and numeral 28 denotes a light beam for recording and reproducing information. In FIG. 3, numeral 29 denotes a rotatable pulley, and numeral 30 denotes a pulley mounted on a servo motor 31. The belt 24 is wound on the pulleys 29 and 30, as the servo motor 31 rotates, the shuttle 11 is reciprocated to left and right in FIG. 3 The optical head 27 is movable, by a mechanism not shown, in a direction orthogonal to the reciprocation direction of the shuttle 11. Thus, the light beam 28 can be positioned to any position in the recording area 25.

A light information recording and reproducing apparatus which uses the above mechanism is disclosed in U.S. Ser. No. 814,774 mentioned above.

It is not so difficult to keep the play between the fixed shaft 13 and the bearings 14 and 14' and the play between the fixed shaft 17 and the rollers 15 and 16 within approximately 5 $\mu$m. It is not so difficult to keep the variation of the card thickness within approximately 0.1 mm. Accordingly, the gap between the step 18 and the card retainer 19 and 20 is within 0.1 mm in the worst case. In this case, it is practical to record and reproduce the information by auto-tracking and auto-focusing servo controls to pits of 5–10 $\mu$m diameter. Further, reciprocation movement at a speed of several reciprocations per second can be attained.

In such light information recording and reproducing apparatus which uses the optical card, it is desirable that the number of information pits recorded or reproduced in a unit time period is large, that is, a transfer rate is high. However, in order to increase the transfer rate, it is necessary to increase the reciprocation speed of the shuttle 11. On the other hand, it is desirable that the shuttle speed is constant during recording or reproducing of information because, if the speed varies, the size of the recording pit varies even if the light beam 28 is turned on and off at a constant frequency, and complex processing is required to resolve the size irregularity problem.

The shuttle 11 has a certain mass even if it is made of a light material such as plastic. Therefore, a speed rise-up time is required before the shuttle speed reaches a predetermined speed after reversal, and a speed fall-down time is required before the shuttle is stopped from the constant speed.

An example of such speed control is shown in FIG. 4, in which an ordinate represents a velocity v of the shuttle 11 and an abscissa represents a time t. Numeral 32 denotes a rise-up area in which the velocity rises up from a stop condition, numeral 33 denotes a constant speed area, numeral 34 denotes a deceleration area in which the speed is decelerated to zero, numeral 32' denotes an acceleration area in the opposite direction after reversal, numeral 33' denotes a constant speed area in the opposite direction and numeral 34' denotes a deceleration area in which the speed is decelerated to zero. This operation is repeated. Such speed control may be attained by a method disclosed in U.S. Ser. No. 814,774 filed by the present applicant.

In the speed control shown in FIG. 4, it is desirable that gradients of the areas 32, 32' 34 and 34' are sharp, because wasted time not used for recording or reproducing is reduced and the transfer rate is increased, and the distance across which the shuttle 11 is moved in the rise-up time and the fall-down time is small and hence a compact apparatus is attained. However, since the shuttle 11 has the mass as described above, if the gradients of the areas 32, 32', 34 and 34' are to be sharp, a high torque output is required for the motor 31 and power consumption increases. As a result, the size of the power supply mounted on the apparatus increases.

SUMMARY OF THE INVENTION

It is an object of the present invention to provide an information recording and reproducing apparatus which can reduce a distance of movement of a shuttle neccesary to reverse the shuttle movement with a small output motor.

The above object is achieved by an information recording and reproducing apparatus which mounts a card-like or sheet-like information recording medium on the shuttle and reciprocates the shuttle relative to a recording and reproducing head to record and reproduce information, in which means is provided to store kinetic energy consumed when the shuttle is decelerated. By storing the kinetic energy, the deceleration of the shuttle is accelerated. When the shuttle is to be accelerated, the stored energy is transduced to a kinetic energy of the shuttle to accelerate the acceleration. As a result, the force to be applied by drive means for the shuttle is reduced.

In the information recording and reproducing apparatus of the present invention, the means for transducing and storing the kinetic energy of the shuttle may be means for transducing the kinetic energy to a resilience energy and storing it such as spring or air cylinder, means for storing an energy by utilizing repelling function of poles of equal polarity of a magnet or an electromagnet, or means for storing a potential energy by lifting up an article of a certain weight.

DESCRIPTION OF THE PREFERRED EMBODIMENTS

The preferred embodiments of the present invention are explained in detail. The present invention can be applied not only to the optical recording apparatus but also to the magnetic recording apparatus although the optical recording apparatus is explained below.

Figure 1:
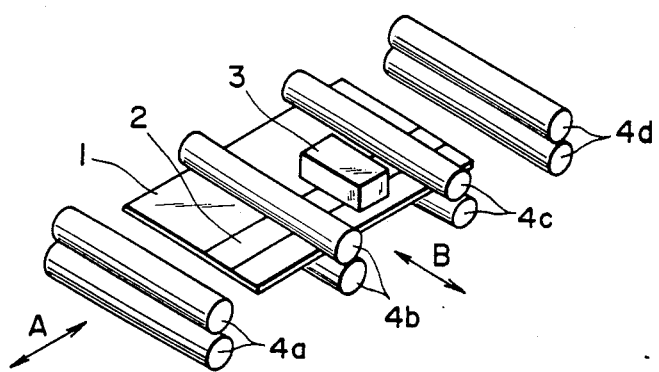
FIG. 1 shows a prior art apparatus.
Figure 2:
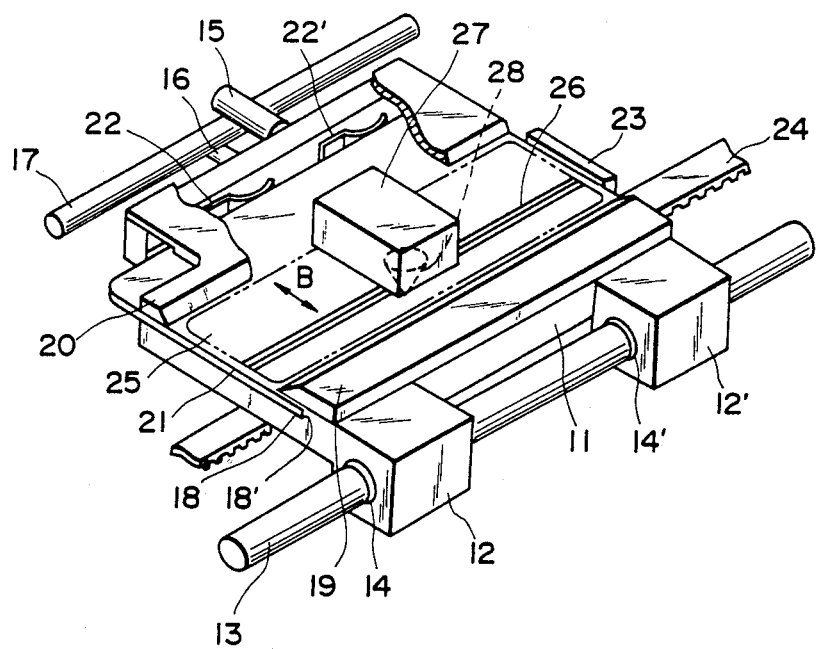
FIGS. 2 and 3 show a mechanism for transporting an information recording medium by using a shuttle.
Figure 3:
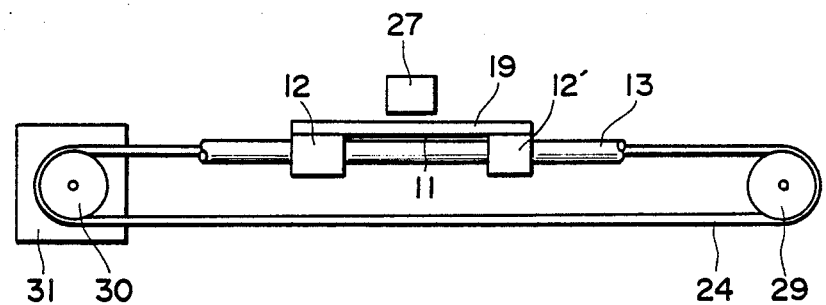
Figure 4:
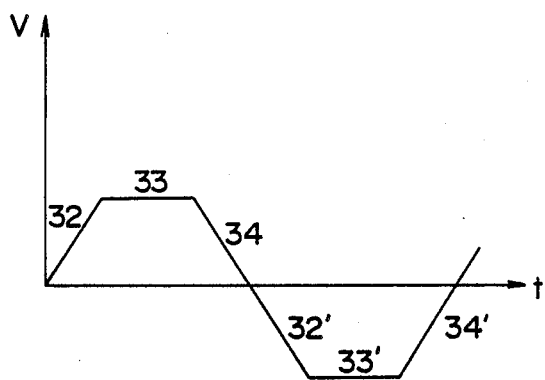
FIG. 4 illustrates transport speed control of an optical card.
Figure 5:
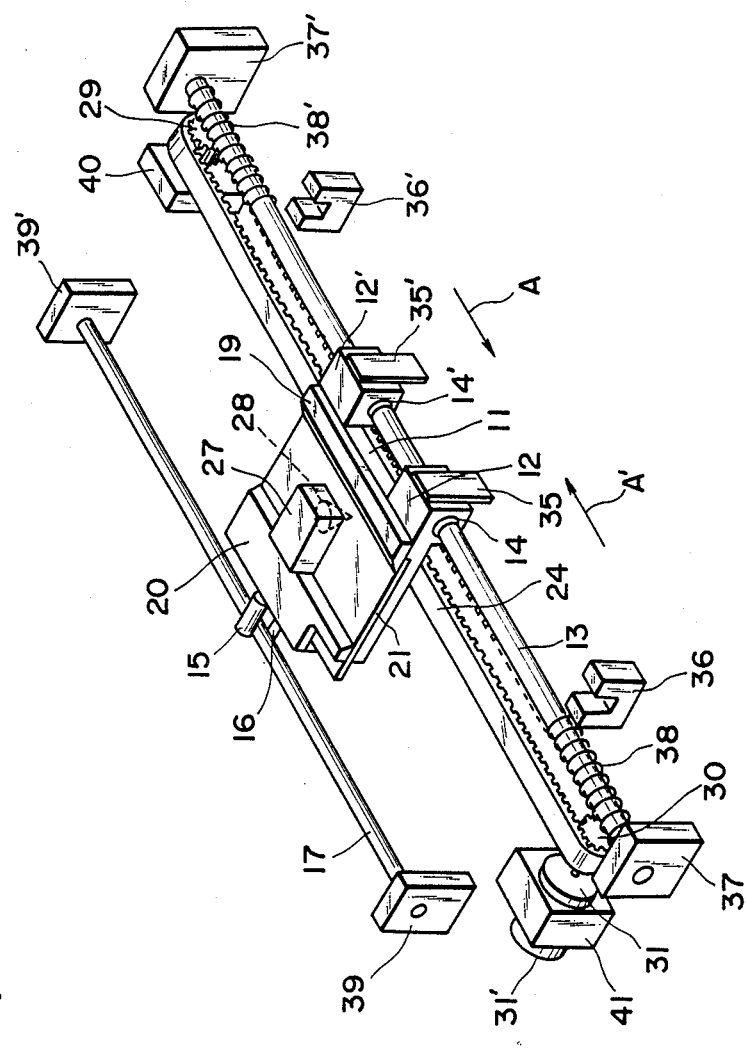
FIGS. 5, 6, 7, 8 and 9 show embodiments of the present apparatus.

FIG. 5 is a perspective view of a first embodiment of the present invention. The like elements to those shown in FIGS. 2 and 3 are designated by the like numerals. In the following description, the general explanation of the optical information recording and reproducing apparatus is omitted.

In FIG. 5, numerals 35 and 35' denote dousers fixed to projections 12 and 12' of a shuttle 11 and they function to block sensors of photo-couplers 36 and 36' fixed to a support (not shown). Numerals 37 and 37' denote holders which are fixed to the support (not shown) and support a shaft 13, numerals 38 and 38' denote springs having first ends thereof fixed to the holders 37 and 37' and second ends thereof slidably mounted on the shaft 13, and numerals 39 and 39' denote holders which are fixed to the support (not shown) and support a shaft 17.

Numeral 40 denotes a holder which is fixed to the support (not shown) and supports a pulley 29, numeral 41 denotes a member which is fixed to the support (not shown) and holds a motor 31, and numeral 31' denote a tachogenerator for detecting a rotating speed of a shaft of the motor 31.

As the motor 31 is rotated and the shuttle 11 is moved at a constant speed toward the direction of arrow A' in FIG. 5 and the douser 35' blocks the photo-coupler 36', a signal is sent to the motor 31 to decelerate the motor 31 (or accelerate the motor 31 in the opposite direction A). The spring 38' is pushed by the projection 12' of the shuttle 11 and it is compressed. Thus, a force to push the shuttle 11 toward the direction of arrow A, which is proportional to the compression distance of the spring 38', acts on the shuttle. By this force and the deceleration force of the motor 31, the movement of the shuttle 11 toward the direction of arrow A' is decelerated more quickly than when it is decelerated without the spring 38', and the shuttle 11 is finally stopped.

Since the spring 38' is pushed by the shuttle 11 and in the compressed state, a force to push back the shuttle 11 toward the direction of arrow A acts on the shuttle 11 so that the shuttle 11 is moved toward the direction of arrow A and accelerated. The motor 31 is also accelerated in the direction to push the shuttle toward the direction of arrow A so that the shuttle 11 is accelerated more quickly by the repelling force of the spring 38' and the torque of the motor 31. When the speed of the shuttle 11 reaches a predetermined speed, the speed is controlled to a constant speed by a servo circuit.

When the douser 35 next blocks the photocoupler 36, a signal is sent to the motor 31 to decelerate the motor 31 (or accelerate the motor 31 in the opposite direction). The spring 38 is pushed by the shuttle 11 and compressed. Thus, a force to push the shuttle 11 toward arrow A', which is proportional to the compression distance of the spring 11, acts on the shuttle 11. By this force and the deceleration force of the motor 31, the velocity of the shuttle 11 toward direction A is decelerated and it finally reaches zero. Since the spring 18 is pushed by the shuttle 11 and is compressed, a force to push back the shuttle toward direction A' acts on acts to the shuttle 11 so that the shuttle 11 is moved toward direction A' and accelerated. Since the motor 31 is also accelerated in the direction to push the shuttle 11 in direction A', the shuttle 11 is accelerated more quickly. As the speed of the shuttle 11 reaches the predetermined speed, it is controlled to keep a constant speed by the servo circuit. The above operations are repeated.

In the present embodiment, the elastic modulus of the springs 38 and 38' is not limited to one type but the springs may be connected in two or more stages to present the acceleration and deceleration characteristics suitable to the apparatus. The resilient member for storing the kinetic energy of the shuttle 11 is not limited to the spring, but it may be synthetic resin having a large elastic modulus on any other member which can store the kinetic energy in the form of resilience energy.

Figure 6:
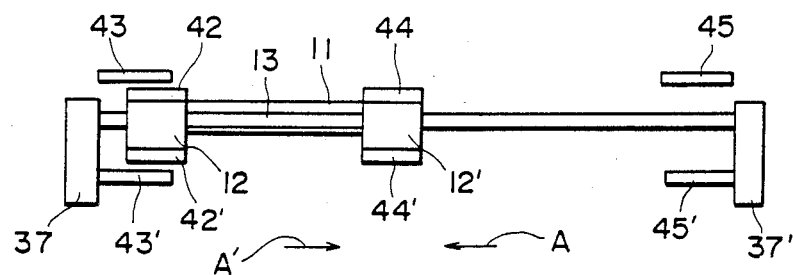

FIG. 6 shows a side elevational view of a second embodiment of the present invention. In FIG. 6, the like elements to those shown in FIGS. 2 and 3 are designated by the like numerals and the construction not shown in FIG. 6 is identical to that shown in FIG. 5, except that the springs 38 and 38' are not provided in the embodiment of FIG. 6.

In FIG. 6, numerals 42 and 42' denote magnets (including electromagnets) arranged on the top and bottom of the projection 12 of the shuttle 11, and numerals 43 and 43' denote magnets (including electromagnets) fixed to a support plate (not shown) by a support member (not shown). When the shuttle 11 is in the position of FIG. 6, the magnets 43 and 43' face the magnets 42 and 42' with small gaps therebetween. The upper side of the magnet 42 and the lower side of the magnet 43 are magnetized to the same polarity as each other, and the lower side of the magnet 42' and the upper side of the magnet 43' are magnetized as the same polarity to each other.

In the embodiment of FIG. 2, when the shuttle 11 is in the position of FIG. 6, a force to move the shuttle 11 to the right (direction A') acts on the shuttle 11 by the repelling force of the magnets, and when the shuttle 11 has been moved to the right (direction A') such that the magnets 44 and 44' force the magnets 45 and 45', a force to move the shuttle 11 to left (direction A) acts by the repelling force of the magnets. Accordingly, like the function of the springs 38 and 38' in the first embodiment shown in FIG. 5, the force is applied to the shuttle 11 when the motor accelerates or decelerates the shuttle 11.

In the present embodiment, if a portion of the magnets is constructed by the electromagnets and currents to the electromagnets are controlled in timed relation with the deceleration, stop and acceleration of the shuttle 11, the strength of the magnetic field can be changed and various deceleration and acceleration characteristic suitable to various apparatus can be attained.

Figure 7:
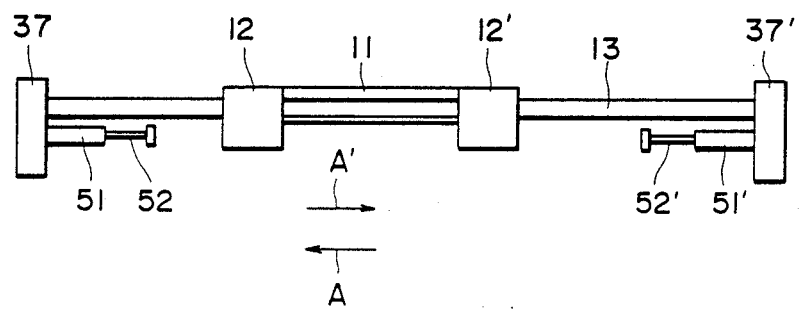

FIG. 7 shows a side elevational view of a third embodiment of the present invention. The like elements to those shown in FIGS. 2 and 3 are designated by the like numerals and construction not shown in FIG. 7 is identical to the construction shown in FIG. 5 except for the springs 38 and 38'. In FIG. 7, numerals 51 and 51' denote air cylinders and numerals 52 and 52' denote movable arms of the cylinders. The air cylinders 51 and 51' are arranged such that when the shuttle 11 is decelerated, the ends 12 and 12' of the shuttle 11 contact to the movable arms 52 and 52' of the cylinders. For example, when the shuttle 11 is moved to the left (direction A) and comes to the deceleration position, the end 12 of the shuttle 11 contacts to the cylinder arm 52 so that the cylinder arm 52 is pushed to the left (direction A) in contact with the shuttle end 12. Thus, the kinetic energy of the shuttle 11 is stored in the air cylinder 51. When the shuttle 11 is stopped and again moved to the right (direction A'), the energy stored in the air cylinder 51 serves to push the shuttle 11 to the right (direction A), and the stored energy is transformed to a kinetic energy to move the shuttle 11 to the right (direction A'). The same function is attained by the air cylinder 51'.

Figure 8:
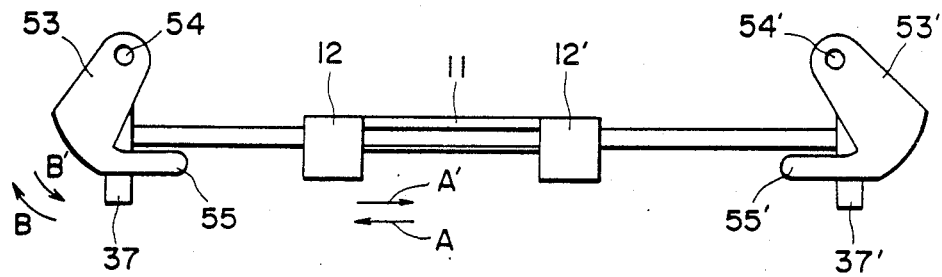

FIG. 8 shows a side elevational view of a fourth embodiment of the present invention. The like elements to those shown in FIGS. 2 and 3 are designated by the like numerals, and construction not shown in FIG. 8 is identical to the construction shown in FIG. 5 except for the springs 38 and 38'. In FIG. 8, numerals 53 and 53' denote weights rotatably held to shafts 54 and 54' fixed to a support member (not shown), and numerals 55 and 55' denote tip ends of the weights 53 and 53'. The weights 53 and 53' are arranged such that when the shuttle 11 starts the deceleration, the ends 12 and 12' of the shuttle 11 contact to the tip ends 55 and 55' of the weights 53 and 53'. For example, in FIG. 8, when the shuttle 11 is moved to the left (direction A) and comes to the deceleration position, the end 12 of the shuttle 11 contacts to the tip end 55 of the weight 53. As the shuttle 11 is moved to the left (direction A) in contact with the tip end 55 of the weight 53, the weight 53 is rotated around the shaft 54 in the direction B and lifted up. As a result, the kinetic energy of the shuttle 11 is stored in the weight 53 as a potential energy of the weight 53. When the shuttle 11 is stopped and again moved to the right (direction A'), the weight 53 is rotated in the direction B' by gravity. The rotation of the weight 53 in the direction B' imparts an acceleration to the right (direction A') to the shuttle 11. The potential energy stored in the weight 53 is transduced to a kinetic energy to move the shuttle 11 to the right (direction A'). The similar function is attained in the weight 53'.

Figure 9:
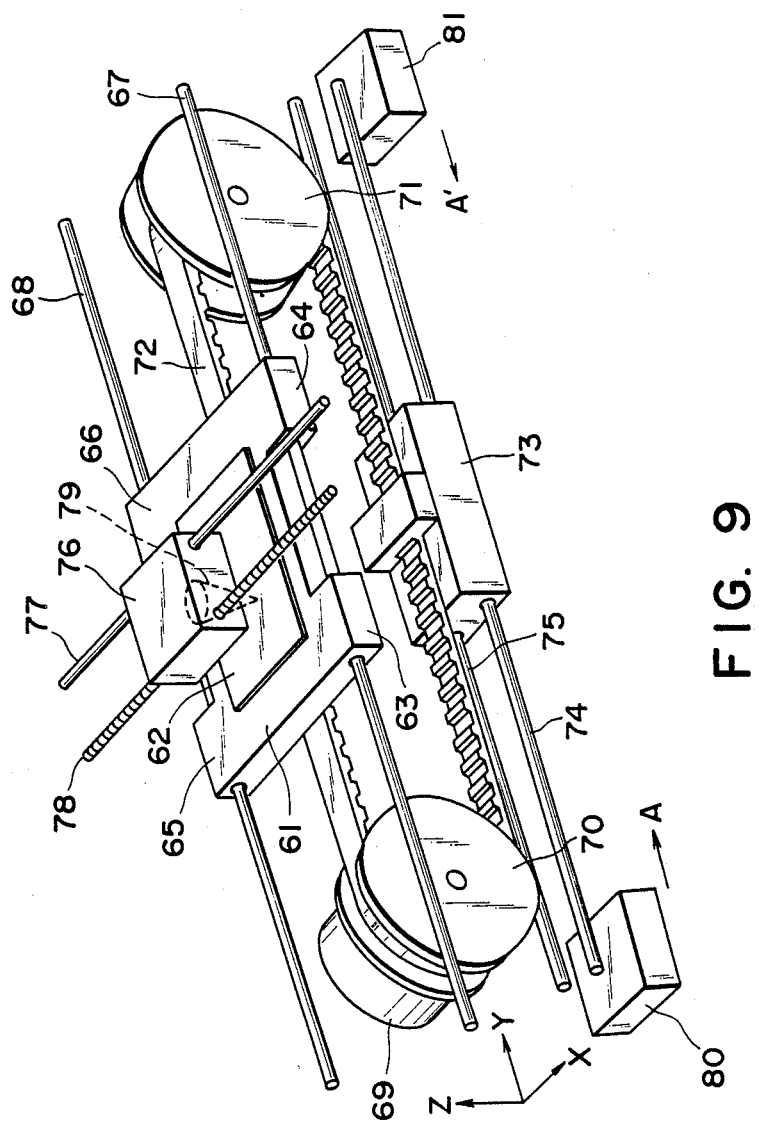

FIG. 9 shows a perspective view of a fifth embodiment of the present invention. In FIG. 9, numeral 61 denotes a shuttle on which a plane parallel to an X - Y plane is formed to receive an optical card 62. The optical card 62 is fixed and held by appropriate means such as one shown in FIG. 5. X-direction projections 63, 64, 65 and 66 are formed at X-direction opposite ends of the shuttle 61. Coaxial Y-direction apertures are formed in the projections 63 and 64 and a guide member 67 is slidably fitted to the apertures. Similarly, coaxial Y-direction apertures are formed in the projections 65 and 66 and a guide member 68 is slidably fitted to the apertures. The guide members 67 and 68 are attached to a frame (not shown).

Numeral 69 denotes a servo motor which is drive means. A pulley 70 is mounted on an X-direction drive rotating shaft of the motor 69. Numeral 71 denotes a pulley which is identical to the pulley 70 and attached to the frame (not shown) rotatably around the X-direction shaft. The motor 69 is also mounted on the frame (not shown). A belt 72 is spanned between the pulleys 70 and 71. The upper span and the lower span of the belt 72 are parallel to the guide members 67 and 68 and a portion of the upper span of the belt 72 is fixed to the lower side of the shuttle 61.

Numeral 73 denotes a counterweight having a weight equal to a sum of the weight of the shuttle 61 and the weight of the optical card 62. The top of the counterweight 73 is fixed to a portion of the lower span of the belt 72. The weight 73 has two Y-direction apertures to which guide members 74 and 75 are slidably fitted, respectively. The guide members 74 and 75 are attached to the frame (not shown).

Numeral 76 denotes an optical head which has an X-direction aperture to which guide member 77 is slidably fitted. Numeral 78 denotes an X-direction lead screw which extends through the optical head 76 which has engaging means to the lead screw 78. The optical head 76 irradiates a focused light beam 79 downward. The guide member 77 is attached to the frame (not shown). Rotating drive means (not shown) is coupled to one end of the lead screw 78, and the drive means and the lead screw 78 are attached to the frame (not shown) to allow rotation of the lead screw.

The optical card 62 is mounted on the mount area of the shuttle 61 at a predetermined attitude and the motor 69 is rotated to drive the belt 72 so that the shuttle 61 is moved in the Y-direction. The motor 61 is rotated forward and backward at an appropriate period to reciprocate the shuttle 61 in an appropriate range. The counterweight 73 is also reciprocated in the Y-direction as the shuttle 61 is reciprocated. The direction of movement of the counterweight 73 is always opposite to that of the shuttle 61. Since the Y-direction forces are always cancelled in the kinetic system comprising the pulleys 70 and 71, belt 72, shuttle 61 and counterweight 73, no strong impact is generated during the reciprocation.

During such reciprocation of the shuttle 61, the light beam 79 is emitted from the head 76 and information is recorded on the optical card 62 or the information recorded on the optical card is reproduced. During the recording or reproducing operation, the lead screw 78 is rotated when the Y-direction movement of the shuttle 61 is reversed or around such reversal so that optical head 76 is moved in the X-direction by a predetermined distance (a multiple of the X-direction interval of the information tracks). Thus, the light beam 79 forms a spot or the desired information track of the optical card 62 and scans serially.

In the embodiment of FIG. 9, the counterweight 73 is a magnet. Numerals 80 and 81 denote magnets fixed to a hold member (not shown). The lower side of the counterweight 73 and the upper sides of the magnets 80 and 81 face each other with small gaps therebetween. At the deceleration position of the shuttle 61, the lower side of the counterweight and the upper side of the magnet start to overlap each other. The magnetic pole on the lower side of the counterweight 73 and the magnetic poles on the upper sides of the magnets 80 and 81 are of the same polarity. Thus, when the conterweight 73 is moved in the direction A' and the upper side of the magnet 80 faces the lower side of the counterweight 73, the counterweight 73 receives a force in the direction A which is proportional to the facing area. This force accelerates the deceleration of the counterweight 73 and it is transduced to a kinetic energy of the counterweight 73 when the counterweight is stopped and then again moved in the direction A to increase the acceleration of the counterweight 73. The same function is attained in the magnet 81. Because the counterweight 73 is a magnet, the shafts 74 and 75 are preferably made of a non-magnetic material such as stainless steel. The counterweight 73 may be an electromagnet which is energized only when the shuttle 61 is accelerated or decelerated. In the apparatus of FIG. 9, the shuttle may be lighter in weight than that of the apparatus of FIG. 6 because the magnet need not be fixed to the shuttle, and the vibration of the shuttle when it is reversed can be prevented by the function of the counterweight.

In the apparatus of FIG. 9, the counterweight 73 is supported by the shafts 74 and 75. Alternatively, the counterweight 73 may be simply secured to the belt 72. As described hereinabove, when the shuttle is accelerated or decelerated, the springs 38, 38' magnets 42, 42', 43, 43', 44, 44', 45, 45', 73, 80, 81, air cylinders 51, 51' or weights 53, 53' apply the forces in the same direction as that of the torque applied by the motor. Thus, the motor torque may be small, the motor power consumption is reduced, the size of the motor is reduced and the cost of the motor is reduced. Since the power supply may be small, the apparatus is compact. If the motor of the same power as that of the prior art apparatus is used, the rise-up time and fall-down time of the shuttle is shortened by the time corresponding to the force applied by the springs or the magnets, and the transfer rate of the optical card is increased. Further, since the distance across which the shuttle is moved in the rise-up time is decreased and the fall-down time, a compact apparatus is provided.

We claim:

1. An information recording and reproducing apparatus comprising:
    a mount table for holding an information recording and reproducing medium;
    mounting means for slidably securing said mount table;
    optical means secured proximate to said mount table for recording and reproducing information on the information recording and reproducing medium;
    means for reciprocating said mount table in opposite directions relative to said optical means, said mount table being reciprocated in an acceleration mode and deceleration mode in each direction; and
    energy storing means having an operating region for decelerating movement of said mount table in the deceleration mode, storing energy generated in the deceleration mode, and transducing the stored energy to kinetic energy in the acceleration mode to accelerate said mount table, wherein
    said mount table is further driven by said reciprocating means into the operating region of said energy storing means in the deceleration mode so as to store energy therein.

2. An apparatus according to claim 1 wherein said energy storing means stores the kinetic energy of said mount table by using a resilient force.

3. An information recording and reproducing apparatus according to claim 1, wherein said energy storing means stores the kinetic energy of said mount table by using either one of a magnetic force and an electromagnetic force.

4. An information recording and reproducing apparatus according to claim 1, wherein said energy storing means stores the kinetic energy of said mount table by using gravity.

5. A reciprocating shuttle for an apparatus comprising:
- a mount table for holding an information recording and reproducing medium;
- optical means secured proximate to said mount table for recording and reproducing information on the information recording and reproducing medium;
- means for reciprocating said mount table in opposite directions relative to said optical means, said mount table being reciprocated in a recording and reproducing period and in a direction reversal period;
- means for driving said reciprocating means so as to reciprocate said mount table at a constant speed during the recording and reproducing period and to accelerate and decelerate said mount table during the direction reversal period; and
- energy storing means having an operating region for decelerating and accelerating movement of said mount table during the direction reversal period, said storing means decelerating movement of said mount table in a deceleration mode, storing energy in the deceleration mode, and transducing the stored energy to kinetic energy in an acceleration mode to accelerate said mount table, wherein
- said driving means further drives said reciprocating means to drive said mount table into the operating region of said energy storing means in the deceleration mode to store energy therein.

6. An information recording and reproducing apparatus according to claim 5, wherein said energy storing means stores the kinetic energy of said mount table by using either one of a magnetic force and an electromagnetic force.

7. An information recording and reproducing apparatus according to claim 5, wherein said energy storing means stores the kinetic energy of said mount table by using gravity.

8. A reciprocating shuttle for an apparatus comprising:
- a mount table for holding an information recording and reproducing medium;
- optical means secured proximate to said mount table for recording and reproducing information on the information recording and reproducing medium;
- means for reciprocating said mount table in opposite directions relative to said optical means, said mount table being reciprocated in a recording and reproducing period and in a direction reversal period;
- means for driving said reciprocating means so as to reciprocate said mount table at a constant speed during the recording and reproducing period and to accelerate and decelerate said mount table during the direction reversal period;
- means for detecting the reciprocating periods of said mount table and sending a detected signal to said driving means to indicate the beginning of the direction reversal period; and
- energy storing means having an operating region for decelerating and accelerating movement of said mount table during the direction reversal period, said storing means decelerating movement of said mount table in the deceleration mode, storing energy in the deceleration mode, and transducing the stored energy to kinetic energy in the acceleration mode to accelerate said mount table, wherein
- said driving means, after receiving the signal from said detecting means, further drives said reciprocating means to drive said mount table into the operating region of said energy storing means in the deceleration mode to store energy therein.

9. An information recording and reproducing apparatus according to claim 8, wherein said energy storing means stores the kinetic energy of said mount table by using either one of a magnetic force and an electromagnetic force.

10. An information recording and reproducing apparatus according to claim 8, wherein said energy storing means stores the kinetic energy of said mount table by using gravity.

* * * * *

UNITED STATES PATENT AND TRADEMARK OFFICE
CERTIFICATE OF CORRECTION

PATENT NO. : 4,935,916

DATED : June 19, 1990

INVENTOR(S) : Kenichi Suzuki, et al.

It is certified that error appears in the above-identified patent and that said Letters Patent is hereby corrected as shown below:

COLUMN 8:

Line 30, "is" (second occurrence) should be deleted.

Line 31, "decreased" should be deleted, and "time," should read --time is decreased,--.

Signed and Sealed this

Thirtieth Day of June, 1992

Attest:

DOUGLAS B. COMER

Attesting Officer

Acting Commissioner of Patents and Trademarks